(12) United States Patent
Boehme

(10) Patent No.: US 8,004,166 B1
(45) Date of Patent: Aug. 23, 2011

(54) GERMICIDAL LAMP

(76) Inventor: Hilary Boehme, Hauppauge, NY (US)

( * ) Notice: Subject to any disclaimer, the term of this patent is extended or adjusted under 35 U.S.C. 154(b) by 0 days.

(21) Appl. No.: 12/657,985

(22) Filed: Feb. 1, 2010

(51) Int. Cl.
*H01J 61/34* (2006.01)

(52) U.S. Cl. .......... 313/25; 313/493; 313/573; 313/634; 313/639; 422/186.07

(58) Field of Classification Search .................. None
See application file for complete search history.

(56) References Cited

U.S. PATENT DOCUMENTS

| | | | |
|---|---|---|---|
| 4,965,484 A | 10/1990 | Fein | |
| 5,095,336 A | 3/1992 | Corona et al. | |
| 5,188,451 A | 2/1993 | Shanks | |
| 5,315,211 A | 5/1994 | Ditlevsen et al. | |
| 5,866,076 A * | 2/1999 | Fencl et al. | 422/121 |
| 5,915,161 A * | 6/1999 | Adams | 422/186.3 |
| 6,372,186 B1 * | 4/2002 | Fencl et al. | 422/121 |
| 6,602,425 B2 * | 8/2003 | Gadgil et al. | 210/744 |
| 6,614,039 B2 | 9/2003 | Hollander | |
| 6,924,495 B1 | 8/2005 | Brickley | |
| 7,053,535 B2 | 5/2006 | Lauwerijssen et al. | |
| 7,721,383 B2 * | 5/2010 | Garcia et al. | 15/324 |
| 2005/0232825 A1 * | 10/2005 | Fowler et al. | 422/121 |
| 2009/0084734 A1 * | 4/2009 | Yencho | 210/741 |

* cited by examiner

*Primary Examiner* — Ashok Patel

(57) ABSTRACT

An improved germicidal lamp of the type containing mercury, having a ceramic base, and disposed in, and preventing contact with, a transparent quartz sleeve to prevent formation of a cold spot in the germicidal lamp caused by an undesirable thermal transfer between the lamp and the sleeve and which causes condensation of the mercury at the cold spot in the germicidal lamp. The improvement includes the ceramic base having a circumferential groove therearound, and a thermally insulating ring siting in the circumferential groove of the ceramic base so as to prevent the ceramic base from contacting the sleeve to prevent formation of the cold spot in the germicidal lamp caused by the undesirable thermal transfer between the lamp and the sleeve and prevent the condensation of the mercury at the cold spot in the germicidal lamp.

5 Claims, 2 Drawing Sheets

GERMICIDAL LAMP

BACKGROUND OF THE INVENTION

A. Field of the Invention

The embodiments of the present invention relate to a germicidal lamp, and more particularly, the embodiments of the present invention relate to a germicidal lamp containing mercury and for disposing in, and preventing contact with, a transparent quartz sleeve to prevent formation of a cold spot in the germicidal lamp caused by an undesirable thermal transfer between the lamp and the sleeve and which causes condensation of the mercury at the cold spot in the germicidal lamp.

B. Description of the Prior Art

From a water treatment system design point of view, there are a few things that can be done to keep the critical temperature zone of the lamp as close to optimum as possible. In test systems, the lamp is placed in a transparent quart sleeve that is immersed in the process water. One of the key purposes of the quartz sleeve is to provide thermal insulation between the lamp and water, thereby allowing the critical lamp zone to reach an adequate temperature despite water that may be just a few degrees above freezing.

Three key design parameters that dictate the temperature differential between the water and critical lamp zone are the diameter of the lamp, the size of the insulating air gap between the lamp and sleeve, and the amount of power driven into the lamp. Other parameters that can be tailored for non-amalgam lamps are end-cap design and electrode position, while amalgam lamps can be tailored by adjusting the size, location, and composition of the amalgam blobs.

The benefit of being able to operate al a lower current and power is that apart from saving energy, the water within the UV chamber will not get as hot during extended periods of no water flow (stagnant water). Unfortunately, there is just no escaping the fact that at normal and colder operating temperatures, the higher power LPHO operation delivers considerably more UV power. Therefore, it can be seen that a variable power system with the capability to force high-power operation when required during high flows and/or lower temperatures, and otherwise throttle back to low power, offers the higher power advantage of LPHO as well as the cooler operating LP benefit.

There are some systems on the market that flow water through a transparent quartz reactor, and place the lamp (or lamps) completely outside the reactor. This type of arrangement may be less impacted by water temperature, but tends to be sensitive to temperature and flow of the cooling air around the lamp. No data is presented on these systems, in part because they require control of the temperature and flow of air as well as that of water, resulting in a matrix of independent test conditions that becomes considerably more complex.

Key factors for proper amalgam lamp operation are to ensure sufficient power input and thermal insulation to keep the amalgam blobs above their critical temperature. If the system design and application do not allow the amalgam to get into their proper operating range, the lamp will have very low UV output and tend to be quite unstable. This is one reason why variable power amalgam systems can be very tricky to operate in practice.

So, what does this all mean to selecting a system for a particular application? In the case of insulations required under government regulations, a certified system with a built-in UV monitor will likely be required, so the main point here is that the sensor calibration be performed under controlled conditions at the manufactures facility.

If water quality is such that the UV transmission (UVT) is low or promotes sleeve fouling (high level of hardness), the system will have less room to tolerate temperature extremes before going into on undesirable alarm condition. This reinforces the importance of assessing the incoming water quality and providing pretreatment as necessary. Re-calibration of sensors in the field to account for specific cite conditions is extremely risky and can invalidate the required certification.

Regardless of whether or not the installation falls under government regulations, it can be seen that having a system with a properly calibrated UV monitor is preferred. Obviously, a non-monitored system can be obtained at a lower cost, and if this becomes the over-riding issue, then it is important to ensure that the non-monitored system is sized conservatively enough to allow for expected swings in water temperature. Of course the same cautions to water quality, pre-treatment, and sensor calibration (for monitored systems) apply as discussed above.

As one encounters various systems and claims of temperature stability, one must keep mind that regardless of the system design strategy used, the laws of physics dictate that the lamp's UVC output will be affected by the temperature of its immediate surrounding environment. In systems with the lamp outside of the treatment chamber (as with a quarts reactor), the cooling air flowing around the lamp becomes the dominating factor, however, in the case of lamps in sleeves immersed in the water, the water temperature becomes the dominant factor—the issue addressed by the embodiments of the present invention.

Referring now to the figures in which like numerals indicate like parts, and particularly to FIG. 1, which is a diagrammatic side elevational view, in partial section, of a prior art germicidal lamp contained in a prior art transparent quartz sleeve immersed in water, the prior art germicidal lamp is shown generally at 10 contained in a prior art transparent quartz sleeve 12 immersed in water 14.

As can be seen, the prior art germicidal lamp 10 terminates in a ceramic base 16 that contacts the prior are transparent quartz sleeve 12 causing formation of a cold spot 20 in the prior art germicidal lamp 10 caused by an undesirable thermal transfer between the prior art germicidal lamp 10 and the sleeve 12 and which causes condensation of mercury 22 at the cold spot 20 in the prior art germicidal lamp 10.

Thus, there exists a need for a germicidal lamp containing mercury and being disposed in and prevented from contact with, a transparent quartz sleeve to prevent formation of a cold spot in the germicidal lamp caused by an undesirable thermal transfer between the lamp and the sleeve and which causes condensation of the mercury at the cold spot in the germicidal lamp.

Numerous innovations for lamps and lamp-related devices have been provided in the prior art, which will be described below in chronological order to show advancement in the art. Even though these innovations may be suitable for the specific individual purposes to which they address, however, they differ from the embodiments of the present invention in that they do not teach a germicidal lamp containing mercury and for disposing in, and preventing contact with, a transparent quartz sleeve to prevent formation of a cold spot in the germicidal lamp caused by an undesirable thermal transfer between the lamp and the sleeve and which causes condensation of the mercury at the cold spot in the germicidal lamp.

(1) U.S. Pat. No. 9,965,984 to Fein.

U.S. Pat. No. 4,965,484 issued to Fein on Oct. 23, 1990 in U.S. class 313 and subclass 15 teaches an end-viewed vapor discharge lamp having a differential temperature control structure that removes heat more effectively from a base end of the lamp than from the light emitting output end of the lamp. The lamp envelope, which contains an excitable vapor, such as mercury, includes a small bore capillary tube with a window at one end. A large bore extension contiguous with the capillary tube and a parallel second tube contain electrodes for providing a discharge in the capillary tube. A thermally conductive shell surrounds, and is spaced apart from, sides of the envelope, and is partly filled with a thermally conductive material around the base end of the envelope. The output end around the capillary tube is free of this material. Heat conduction is better at the base end, so that the capillary tube runs hotter, inhibiting condensation of vapor and giving a stable light output. An optional heater pad may be provided around the shell for maintaining an optimal temperature for maximum light output.

(2) U.S. Pat. No. 5,095,336 to Corona et al.

U.S. Pat. No. 5,095,336 issued to Corona et al. on Mar. 10, 1992 in U.S. class 355 and subclass 229 teaches an amalgam fluorescent operates with minimum axial illumination variations when changing from an off to an on state. This is accomplished by incorporating at least three amalgam patches internal to the lamp. Two patches are located at opposite ends of the lamp, and at least a third patch is centrally located. Each patch has an associated thermistor and an external heater sleeve. The patch temperature, which correlates with the optimum lamp operating temperature, is continuously monitored, and adjustments are made to the heater sleeve elements to maintain the patches at a desired optimum temperature.

(3) U.S. Pat. No. 5,188,451 to Shanks.

U.S. Pat. No. 5,188,451 issued to Shanks on Feb. 23, 1993 in U.S. class 362 and subclass 223 teaches an elongated jacketed discharge lamp using a spacer end cap in the form of a one-piece body of thermally insulating material having an annular ring-shaped side portion and an annular disk-shaped end portion integrally-connected therewith. The annular side portion has an annular interior wall surface defining a central cavity receiving and frictionally engaging at least the periphery of an end base on an end of an envelope tube of the jacketed lamp. The annular side portion also has an annular groove formed therein receiving and seating one end of an outer sleeve which surrounds the envelope tube of the jacketed lamp. The groove is defined by an outer annular wall surface surrounding and frictionally engaging the exterior of the one end of the outer sleeve and an inner annular wall surface spaced radially inwardly from the interior of the end of the outer sleeve away from frictional engagement therewith. The annular end portion has an annular inner rim defining a central aperture through which protrudes an annular contact pin-containing housing projecting from the end base on the envelope tube end. The annular inner rim sealably surrounds the annular housing and overlies a peripheral edge of the envelope tube end base.

(4) U.S. Pat. No. 5,315,211 to Ditlevsen et al.

U.S. Pat. No. 5,315,211 issued to Ditlevsen et al. on May 24, 1994 in U.S. class 315 and subclass 50 teaches an insulator applied to the ends of a fluorescent lamp that operates in a cold environment. The insulator retains the heat generated by the fluorescent lamp in order to reduce the energy that must be applied to cause the lamp to fire.

(5) U.S. Pat. No. 6,614,039 B2 to Hollander.

U.S. Pat. No. 6,614,039 B2 issued to Hollander on Sep. 2, 2003 in U.S. class 250 and subclass 504 R teaches an ultraviolet light source including an ultraviolet light bulb or lamp, a power source for providing power to the ultraviolet light bulb, and a non-glass or non-quartz protective sleeve that surrounds the ultraviolet light bulb. The ultraviolet light bulb, preferably, includes a casing for holding a starting gas and a vaporizable material, and at least one electrode electrically coupled to the power source for exciting the starting gas and the vaporizable material within the casing. The casing is made of soft glass or quartz material, and the protective sleeve is a fluoropolymer sleeve that surrounds the soft glass or quartz casing. The fluoropolymer sleeve may include any suitable fluoropolymer material, such as Teflon® products like PTFE, FEP, PFA, AF, Tefzel® ETFE, and the like. In addition, some silicon based materials or other UV transmissive non-glass materials can be used for the protective sleeve.

(6) U.S. Pat. No. 6,924,495 to Brickley.

U.S. Pat. No. 6,924,495 issued to Brickley on Aug. 2, 2005 in U.S. class 250 and subclass 504 R teaches a heat controlled ultraviolet light apparatus that includes a source of ultraviolet light, a cover, and a heating or cooling element that heats/cools the space or gap between the ultraviolet light source and the cover. Thus, the ultraviolet light source may be maintained at an optimal temperature, thereby maximizing the efficiency of the ultraviolet light source in producing ultraviolet radiation. The apparatus may further include a temperature sensor and a control circuit to automatically control production of heat/cooling by the element based upon the ambient temperatures experienced by the ultraviolet light source during use. Methods are also provided for sanitizing heating and cooling coils of various devices, such as an HVAC system, and cooling systems, such as a refrigeration unit and an evaporative cooler.

(7) U.S. Pat. No. 7,053,535 B2 to Lauwerijssen et al.

U.S. Pat. No. 7,053,535 B2 issued to Lauwerijssen et al. on May 30, 2006 in U.S. class 313 and subclass 151 teaches a low-pressure mercury vapor discharge lamp including a discharge vessel having two end portions. An electrode carrier is arranged in an end portion and carries an electrode for generating and maintaining a discharge in the discharge vessel. The electrode carrier is at least partly made of a bimetal or a memory metal, and is formed so that the distance between the electrode and the far end of the end portion increases if the temperature of electrode carrier increases.

It is apparent that numerous innovations for lamps and lamp-related devices have been provided in the prior art, which are adapted to be used. Furthermore, even though these innovations may be suitable for the specific individual purposes to which they address, however, they would not be suitable for the purposes of the present invention as heretofore described, namely, a germicidal lamp containing mercury and for disposing in, and preventing contact with, a transparent quartz sleeve to prevent formation of a cold spot in the germicidal lamp caused by an undesirable thermal transfer between the lamp and the sleeve and which causes condensation of the mercury at the cold spot in the germicidal lamp.

SUMMARY OF THE INVENTION

Thus, it is an object of the embodiments of the present invention to provide a germicidal lamp containing mercury and for disposing in, and preventing contact with, a transparent quartz sleeve to prevent formation of a cold spot in the germicidal lamp caused by an undesirable thermal transfer between the lamp and the sleeve and which causes condensation of the mercury at the cold spot in the germicidal lamp, which avoids the disadvantages of the prior art.

Briefly stated, another object of the embodiments of the present invention is to provide an improved germicidal lamp of the type containing mercury, having a ceramic base, and disposed in, and preventing contact with, a transparent quartz sleeve to prevent formation of a cold spot in the germicidal lamp caused by an undesirable thermal transfer between the lamp and the sleeve and which causes condensation of the mercury at the cold spot in the germicidal lamp. The improvement includes the ceramic base having a circumferential groove therearound, and a thermally insulating ring siting in the circumferential groove of the ceramic base so as to prevent the ceramic base from contacting the sleeve to prevent formation of the cold spot in the germicidal lamp caused by the undesirable thermal transfer between the lamp and the sleeve and prevent the condensation of the mercury at the cold spot in the germicidal lamp.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying drawings.

BRIEF DESCRIPTION OF THE DRAWINGS

The figures of the drawings are briefly described as follows.

LIST OF REFERENCE NUMERALS UTILIZED IN THE DRAWING

Figure 1:
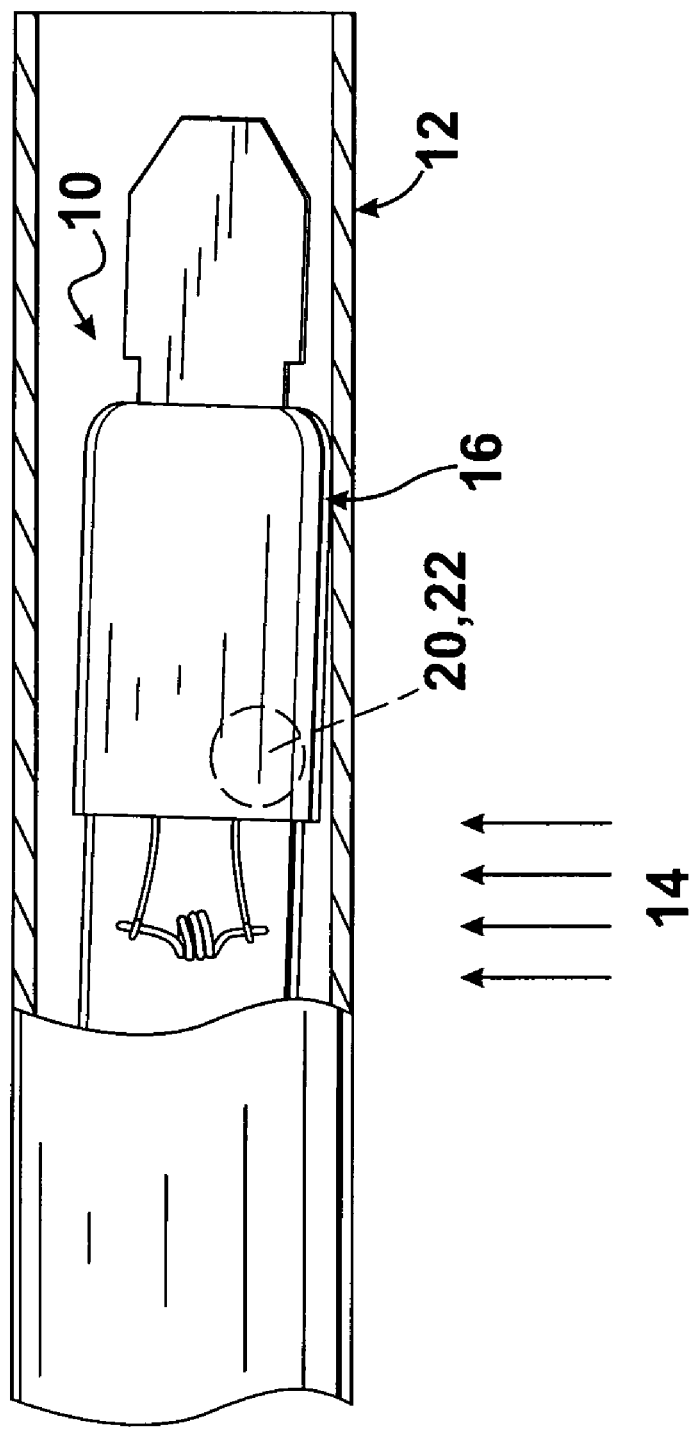
FIG. 1 is a diagrammatic side elevational view, in partial section, of a prior art germicidal lamp contained in a prior art transparent quartz sleeve immersed in water.

A. Prior Art.
10 prior art germicidal lamp
12 prior art transparent quartz sleeve
14 water
16 ceramic base of prior art germicidal lamp 10
20 cold spot in prior art germicidal lamp 10
22 mercury in prior art germicidal lamp 10
B. General.
24 germicidal lamp of embodiments of the present invention for disposing in, and preventing contact with, transparent quartz sleeve 12 to prevent formation of cold spot 20 in germicidal lamp 24 caused by undesirable thermal transfer between lamp 24 and sleeve 12 and which prevents condensation of mercury 22 at cold spot 20 in germicidal lamp 24
C. Improvement.
28 circumferential groove of ceramic base 16
30 axis of lamp 24
32 thermally insulating ring

DETAILED DESCRIPTION OF THE PREFERRED EMBODIMENTS

A. General.

Figure 2:
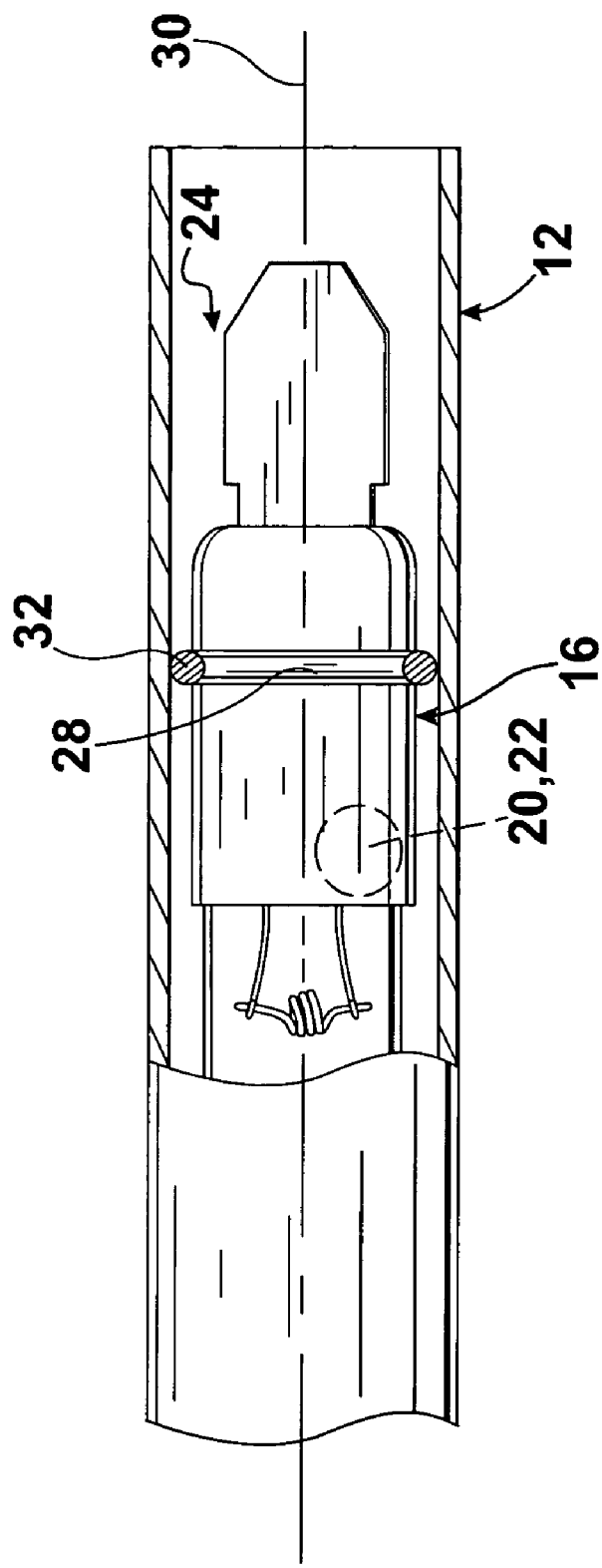
FIG. 2 is a diagrammatic side elevational view, in partial section, of the germicidal lamp containing mercury of the embodiments of the present invention disposed in, and preventing contact with, a transparent quartz sleeve to prevent formation of a cold spot in the germicidal lamp caused by an undesirable thermal transfer between the lamp and the sleeve and which causes condensation of the mercury at the cold spot in the germicidal lamp.

Referring now to FIG. 2, which is a diagrammatic side elevational view, in partial section, of the germicidal lamp containing mercury of the embodiments of the present invention disposed in, and preventing contact with, a transparent quartz sleeve to prevent formation of a cold spot in the germicidal lamp caused by an undesirable thermal transfer between the lamp and the sleeve and which causes condensation of the mercury at the cold spot in the germicidal lamp, the germicidal lamp containing mercury of the embodiments of the present invention is shown generally at 24 for disposing in, and preventing contact with, the transparent quartz sleeve 12 to prevent formation of the cold spot 20 in the germicidal lamp 24 caused by an undesirable thermal transfer between the lamp 24 and the sleeve 12 and which prevents condensation of the mercury 22 at the cold spot 20 in the germicidal lamp 24.

B. The Improvement.

The improvement comprises the ceramic base 16 having a circumferential groove 28 therearound. The circumferential groove 28 of the ceramic base 16 extends normal to the axis 30 of the lamp 24, and is disposed intermediately along the ceramic base 16.

The improvement further comprises a thermally insulating ring 32. The thermally insulating ring 32 sits in the circumferential groove 28 of the ceramic base 16 and extends radially outwardly therefrom so as to prevent the ceramic base 16 from contacting the sleeve 12 to prevent formation of the cold spot 20 in the germicidal lamp 24 caused by the undesirable thermal transfer between the lamp 24 and the sleeve 12 and prevent the condensation of the mercury 22 at the cold spot 20 in the germicidal lamp 24.

The thermally insulating ring 32 is, preferably, an elastomer "O"-ring.

C. Impressions.

It will be understood that each of the elements described above or two or more together may also find a useful application in other types of constructions differing from the types described above.

While the embodiments of the present invention have been illustrated and described as embodied in an improved germicidal lamp, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features from the standpoint of prior art fairly constitute characteristics of the generic or specific aspects of the embodiments of the present invention.

The invention claimed is:

1. An improved germicidal lamp containing mercury, having a ceramic base, and disposed in, and preventing contact with, a transparent quartz sleeve to prevent formation of a cold spot in the germicidal lamp caused by an undesirable thermal transfer between the lamp and the sleeve and which prevents condensation of the mercury at the cold spot in the germicidal lamp, wherein said improvement comprises:

the ceramic base having a circumferential groove therearound; and a thermally insulating ring siting in the circumferential groove of the ceramic base so as to prevent the ceramic base from contacting the sleeve to prevent formation of the cold spot in the germicidal lamp caused by the undesirable thermal transfer between the lamp and the sleeve and prevent the condensation of the mercury at the cold spot in the germicidal lamp.

2. The improvement of claim 1, wherein said circumferential groove of said ceramic base extends normal to the axis of the lamp.

3. The improvement of claim 1, wherein said circumferential groove of said ceramic base is disposed intermediately along the ceramic base.

4. The improvement of claim 1, wherein said thermally insulating ring extends radially outwardly from said circumferential groove of said ceramic base.

5. The improvement of claim 1, wherein said thermally insulating ring is an elastomer "O"-ring.

* * * * *